July 1, 1924.

B. M. W. HANSON 1,499,730

GAUGE INSTRUMENT

Filed May 21, 1923

Inventor
Bengt M. W. Hanson
by W. Clay Lindsey
Attorney

Patented July 1, 1924.

1,499,730

UNITED STATES PATENT OFFICE.

BENGT M. W. HANSON, OF HARTFORD, CONNECTICUT.

GAUGE INSTRUMENT.

Application filed May 21, 1923. Serial No. 640,350.

*To all whom it may concern:*

Be it known that I, BENGT M. W. HANSON, a citizen of the United States, and a resident of Hartford, in the county of Hartford, State of Connecticut, have invented certain new and useful Improvements in a Gauge Instrument, of which the following is a specification.

This invention relates to gauges and measuring instruments, and, more particularly, to gauges for measuring inaccuracies in screw threaded or serrated members.

One object of the invention is to provide an improved construction and arrangement of parts for an instrument of this character.

Another object of the invention is to provide an instrument of this character which is particularly adapted to measure and compare members having interrupted threads or serrations, and, more particularly, in cases where there is an odd number of interruptions in the threads, such as, for instance, three fluted taps.

Still another object of the invention is to provide an instrument for measuring and comparing threaded members of this type having various diameters but the same thread pitch.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the appended claims.

In the drawing forming a part of this specification and in which similar reference characters refer to similar parts, Fig. 1 is an elevation showing a measuring instrument of the character above described and embodying features of the invention, portions thereof being cut away to show the internal construction more clearly;

Figure 4:
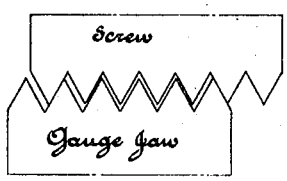
Figs. 4 and 5 are diagrammatic views showing the manner in which inaccuracies in lead of a screw thread may be determined.

Referring to the drawings, the instrument comprises a base 1 supporting a holder 2 for a pair of angularly disposed gauge members 3, and a micrometer 4 adjustably supported on an arm rigidly fastened to the base 1.

The holder 2 comprises a base 6 which may be moved to any convenient position on the platform 7 of the base 1 and which is adapted to support, by means of screws or in any suitable fashion, a pair of blocks 8 upon which the gauge members 3 are adapted to lie and be supported. The adjacent faces of the blocks 8 are at an angle to each other, this angle depending upon the character of the member which is to be tested or measured by the gauge instrument. The gauge members 3 are held in position by means of plates 9 secured to the blocks 8 by suitable screws, as indicated at 10. Each of these gauge members has on its active face parallel serrations corresponding in cross section generally to the thread to be measured, and the serrations of one member are inclined to those of the other because of the angle of lead of a thread.

The micrometer 4 is of the usual type having a barrel 12 to move a spindle 13 back and forth in a well known manner, the barrel and body being suitably graduated for accurately determining the amount of movement back and forth of the spindle. On the end of the spindle 13 there is provided a sharp point 14 which is sufficiently sharp to fit between the threads of ordinary screws.

The type of threaded members which this instrument is most particularly adapted to measure are articles, such as taps, which are provided with an odd number of flutes as, for instance, the tap 17. This tap is of such character, it having three flutes, that its diameter could not be measured by a measuring device which had directly opposed gauge members. Therefore, the instrument as above described is well adapted to measure the diameter of the tap such as shown at 17 because the faces of the gauge blocks each contact with a threaded portion of the tap, and the pin 14 is adapted to contact with another threaded portion substantially opposite to the gauge members. The angle at which the gauge members 3 are disposed to one another may be varied to suit conditions. If the taps are provided with a greater number of flutes than the tap here shown, for instance if the tap were provided with five flutes, it would be preferable to increase the angle between the gauge members to get the most accurate results by measurement.

It is more convenient for determining the inaccuracy in the diameter of a tap if the reading on the micrometer is zero when measuring a standard piece. Therefore, I provide a threaded bushing 20 which may be screwed into the arm 5 and which is securely fastened to the body of the micrometer 4. Thus, with a standard tap placed between the gauge members 3 and with the micrometer reading set at zero or any other convenient even number, the bushing 20 may be screwed back or forth, as the case may be, until the pin 14 contacts properly in the upper threads of the tap. At this position, a screw 22 may be tightened to hold the bushing against further movement. Thereafter, other taps of nearly the same diameter may be placed between the gauge members 3 and measured by the micrometer, the inaccuracy in the diameter of the tap being indicated by the difference between the final reading and the initial reading on the micrometer.

Figure 3:
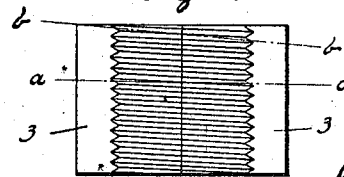
Fig. 3 is an enlarged view of the serrated faces of the gauge member.

The gauge members 3 may be used for a wide range of diameters of taps or similar members, it being necessary, however, that the pitch of all of such taps be the same, that is to say, assuming that the gauge members 3 are adapted for use with a tap having twenty threads to the inch, these same members could be used for measuring taps of a great range of diameters all of which are provided with twenty threads to the inch. It is, of course, evident that the pitch angle of such screws would vary with the diameter, it being greater for the smaller sizes and lesser for the larger sizes. I, preferably, make the inclination of the serrations on the gauge members 3 a mean between the extremes of the pitch angles of the sizes which I desire to measure. For instance, if the capacity of the device ranged from one-half inch to one inch taps of the same pitch, the angle of inclination of the serrations will be a mean between the angle of pitch (indicated by line $a$—$a$ of Fig. 3) of the one inch tap, and the angle of pitch (indicated by line $b$—$b$ of Fig. 3) of the one-half inch tap.

The gauge above described may be used for measuring inaccuracies in the lead or pitch of a screw in the following manner. First, a screw or tap is placed between the gauge members 3 far enough to engage one thread only, and the micrometer barrel 12 is then screwed down to contact with the screw; the reading of the micrometer is noted. Then the screw is placed so that a greater number of threads are engaged by the gauge jaws 3, and a second reading of the micrometer is taken. Preferably, the screw should be placed so that the entire serrated face of each gauge member engages the screw being tested. If the lead of the screw is accurate, the second reading of the micrometer should be the same as the initial reading. However, in cases where the lead of the screw thread is not accurate, the sides of the teeth on the serrated faces of the gauge members will climb, so to speak, the sides of the first and last thread of the screw within the gauge, and the micrometer reading in this position will be greater than the initial reading. The greater the inaccuracy in lead, the greater will be the diameter indicated by the micrometer, and, therefore, the gauge may be calibrated and the data thus obtained may be tabulated so as to indicate at a glance the inaccuracy in lead for an observed difference in initial and final micrometer readings, taken as above described.

Figure 5:
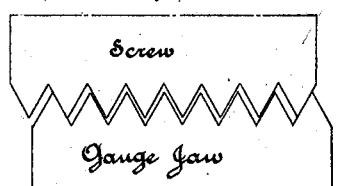
Figure 1:
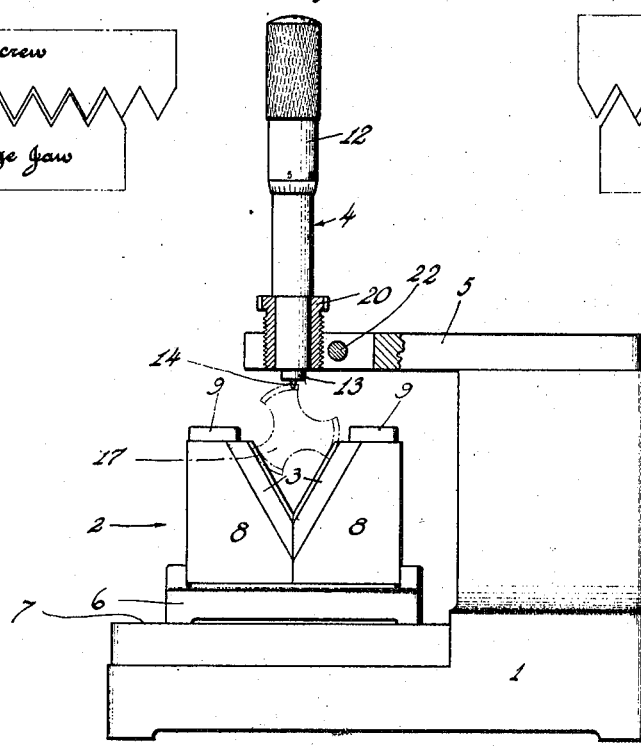
Figure 2:
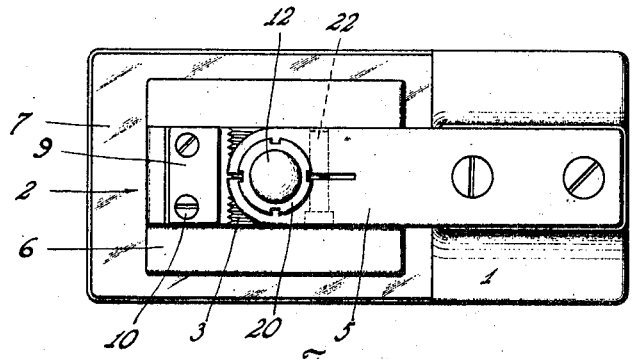
Fig. 2 is a plan view of the instrument shown in Fig. 1.

This will be more clearly understood by reference to Fig. 4 showing a screw of too small lead in engagement with a gauge jaw. The screw and gauge member contact on the inside faces of the first and last thread within the gauge. This is the "climbing" above referred to, which results in an apparent diameter greater than its actual value. The same result is produced when the screw thread is of larger lead than the gauge member. By referring to Fig. 5, it will be seen that there are only two threads of the screw which contact with the opposed or inside faces of the serrations of the gauge jaw causing the same result as in the case where the lead is too great.

Likewise, this gauge will disclose variations in diameter caused by incorrect inclination of the sides of the thread, since, if the side angle of the thread is too great, the serrations on the face of the gauge members 3 will not enter to the root of the thread of the piece being measured. Such an inaccuracy will be indicated by the difference in diameter of a standard thread or plug gauge and the test piece. This inaccuracy will also be apparent upon examination with a magnifying glass while the piece is within the gauge members.

As above stated, the arrangement of the apparatus is such that the holder may be moved about on the platform 7 to any position desired.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A measuring instrument comprising, in combination, a base, a pair of angularly disposed serrated gauge members adapted to receive a threaded member therebetween, and a micrometer adjustably supported by said base and adapted to contact with a side of the threaded member.

2. A measuring instrument comprising, in combination, a base, a pair of gauge members supported on said base, and a micrometer mounted on said base above said gauge members, and means to adjust said micrometer to an initial position and reading, said means comprising a threaded bushing supporting said micrometer.

3. A measuring instrument comprising, in combination, a base, a pair of angularly disposed serrated gauge blocks supported thereby and arranged to receive any of a variety of sizes of threaded members therebetween, a micrometer supported by said base above said gauge members, and means to adjust said micrometer to an initial position and reading for any of said threaded members.

4. A measuring instrument comprising, in combination, a base, a pair of angularly disposed gauge members supported thereby and arranged to receive any of a variety of sizes of threaded members therebetween, a micrometer supported by said base above said gauge members, and means to adjust said micrometer to an initial position and reading for any of said threaded members, said means comprising a bushing supporting said micrometer and threaded into said base.

5. A measuring instrument comprising, in combination, a base, a pair of angularly disposed serrated gauge members supported thereby and arranged to receive therebetween any of a variety of sizes of threaded members having a pitch corresponding to the spacing of the serrations in said gauge members, the serrations in said gauge members being inclined to correspond to a mean between the extreme pitch angles of the threaded members.

6. A measuring instrument comprising, in combination, a base, a pair of angularly disposed serrated gauge members supported thereby and arranged to receive therebetween any of a variety of sizes of threaded members having a pitch corresponding to the spacing of the serrations in said gauge members, the serrations in said gauge members being inclined to correspond to a mean between the extreme pitch angles of the threaded members, a micrometer supported by said base above said gauge members, and means to adjust said micrometer to an initial position and reading for any of said threaded members, said means comprising a bushing supporting said micrometer and threaded into said base.

7. A measuring instrument comprising, in combination, a base, a support adjustable thereon, a pair of angularly disposed serrated gauge members on said support and adapted to receive a threaded member, and a micrometer carried by said base and adapted to contact with a side of the threaded member.

BENGT M. W. HANSON.